April 26, 1960     R. C. SPROULL ET AL     2,934,686

LOW POWER FACTOR CAPACITOR

Filed April 26, 1955

INVENTORS.
HERBERT G. HARD, JR. &
REAVIS C. SPROULL

BY

*Arthur G. Connolly*

THEIR ATTORNEY.

2,934,686
Patented Apr. 26, 1960

2,934,686

LOW POWER FACTOR CAPACITOR

Reavis C. Sproull, Savannah, Ga., and Herbert G. Hard, Jr., Opelika, Ala., assignors to Sprague Electric Company, North Adams, Mass., a corporation of Massachusetts Application April 26, 1955, Serial No. 503,867

2 Claims. (Cl. 317—258)

The present invention relates to electrical capacitors, more particularly to capacitors having paper dielectrics. Paper is one of the most convenient materials to use for capacitor dielectrics, largely because it is quite inexpensive, withstands relatively high electrical stresses, is available in many thicknesses, is pliable and can be used to make the so-called wound type of capacitors which are readily manufactured. Unfortunately, however, the paper dielectrics heretofore used are not too efficient and absorb a relatively high proportion of electrical energy that is passed through them. This lack of efficiency is represented by a power factor scale which indicates the percentage of the supplied power which is not transmitted by a capacitor having the particular dielectric.

Electrical energy absorbed in a capacitor is transformed into heat and dissipation of this heat becomes progressively more difficult as the size of the capacitor increases, by reason of the decrease in surface area relative to the amount of heat generated. The power factor of the dielectric is a measure of energy loss, a low power factor characterizing low energy loss and hence little heating. Should the power factor increase unduly as the temperature rises, the undesirable heat accumulation may cause power factor instability. This may take place because an increase in heating increases the power factor and thereby further increases the generation of heat, this effect continuing until the temperature reaches a point where the capacitor is destroyed. It is desired in the capacitor field to increase the capacity per unit volume of the individual capacitors and to operate them at higher ambient temperatures such as in the crowded chassis of a television or radio receiver where adjacent hot components such as vacuum tubes and power supply transformers effect considerable heating. It is accordingly very desirable to use condenser dielectrics of low power factor, and this is and has been the constant aim of research in the capacitor field. An improvement of even a small fraction of one percent, particularly at operating temperatures, is very important.

Among the objects of the present invention is the provision of paper capacitor dielectrics having a power factor lower than heretofore obtainable.

Other objects of the invention include the provision of paper capacitor dielectrics having thicknesses smaller than previously considered possible.

Further objects of the invention include a method for preparing the above dielectrics and capacitors incorporating these dielectrics.

The above, as well as additional objects of the present invention will be more readily understood from the following description of several of its embodiments, reference being made to the accompanying drawings wherein.

Figure 1:
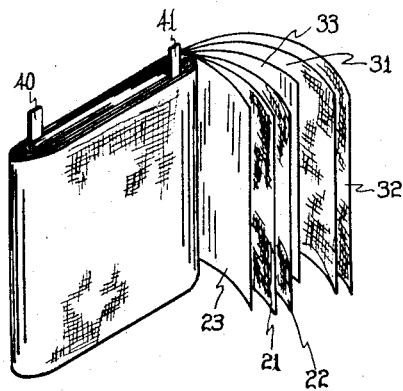
Fig. 1 is a perspective view of a wound type capacitor embodying the invention, the capacitor being partially unwound to more clearly illustrate its structure.

An early type of kraft capacitor paper, described in Allen, U.S. Patent No. 1,850,702, issued March 22, 1932, had a power factor range of 0.15 to 0.25% in a commercial operating temperature range. This paper was prepared by a gradual beating process and calendered to a density of about 1.0.

Kraft capacitor paper of low power factor, taught by Hopkins et al., U.S. Patent No. 2,505,545, issued April 25, 1950, was obtained from chemically modified kraft pulp moderately beaten and lightly calendered so as to produce a sheet of low density (0.60 to 0.80 g./cc.).

It has been discovered that a paper dielectric with a considerably diminished power factor can be made at a high density with concomitant advantages in strength and dielectric constant, if an unbleached, coniferous kraft pulp, is carefully beaten until its Schopper-Riegler freeness passes through a minimum and while increasing with additional beating, is in the range of 75 to 175 ml. Such a furnish produces, with little or no calender pressure, a sheet having a density of 1.0 to 1.1, with a power factor as low as 0.040% and may be supercalendered to densities of 1.20 to 1.30, and to thicknesses of 0.12 to 0.16 mils.

A quantity of raw, unmodified, southern kraft pulp was washed until the electrical conductivity of the washings indicates that the washings have salts equivalent to 1.8 parts of NaCl per million, then adjusted to a consistency of 2% and beaten in a Valley Laboratory paper beater, the freeness being periodically measured as by the standard Schopper-Riegler freeness tester with the beater adjustment not changed during the beating. The freeness drops off rapidly for several hours but then starts to rise again. The beating is stopped when the rising freeness reaches 125 ml. and the beaten pulp is now sheeted out on a standard Fourdrinier wire, suitable dilution and adjustment of the rate of flow onto the wire being made to vary the thickness of the final sheet. At a ½% dilution, the resulting sheet after drying and calendering but without supercalendering is 0.2 mil thick and has a density between about 1.01 and 1.10 grams per cubic centimeter. After calendering between 6 to 8 inch calender rolls pressed together by a force corresponding to about 1000-3000 pounds per inch of paper width, it has a thickness of about 0.17 to 0.19 mil.

The sharpness of the beater roll bars, consistency of the stock, temperature at which the operation is carried out, pressure between the beater bars and bed plate, speed of beating chemical composition of the pulp etc. are all of significant effect in the preparation of a paper-making furnish. The above results were for example obtained with a force of 26 pounds pressing the beater bar against the bed plate, with smaller forces, longer beating times would be needed to obtain these results. In fact in some cases 12 or more hours of beating are necessary. In each case, however, the advantages of the invention are produced only if the stock has the freeness characteristics described above.

Figure 3:
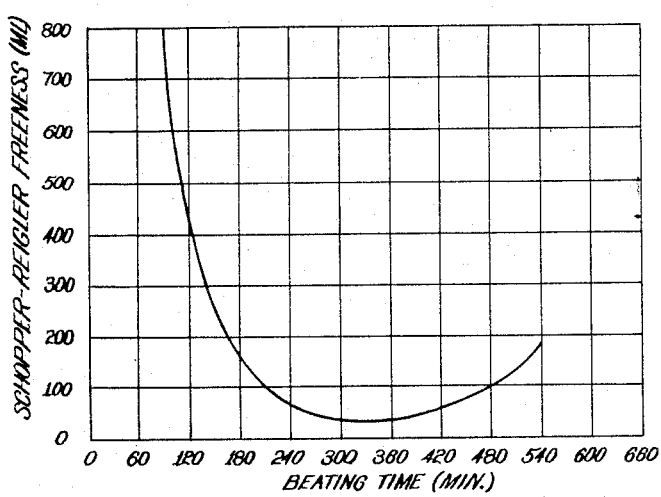
Fig. 3 is a chart illustrating a step in the preparation of the dielectric of the invention.

Fig. 3 shows how the Schopper-Riegler freeness changes when the beating is carried out under a force of 26 pounds. During the beating of the pulp in the manufacture of the paper it is generally not necessary to adjust the beater pressure more than once, and in most cases the original beater pressures can be maintained throughout the entire beating operation, it merely being necessary to continue beating into the rising freeness range as described above.

The Hopkins et al. patent referred to above suggests a moderately beaten pulp from which is derived a low density, low loss capacitor paper. Such paper of Hopkins et al. would be produced from a pulp having a freeness which is falling with continued beating and is between 60 and 30 mil in Fig. 3.

There is a substantial distinction between the particle size distribution of the pulps of the present invention as contrasted to those pulps falling within the above-mentioned Hopkins et al. range of freeness. Such classification was determined on a Bauer-McNett classifier. The following data indicates the variation in particle size distribution with changing freeness:

TABLE I

*Raw unmodified southern-kraft pulp*

| Sample | Schopper-Riegler Freeness, (ml.) | Percent Sample Retained | | | | |
|---|---|---|---|---|---|---|
| | | on 48 mesh | through 48 on 100 | −100 +150 | −150 +200 | −200 |
| A | 60 | 43.7 | 23.1 | 3.3 | 7.6 | 22.3 |
| B | 30 | 17.6 | 25.4 | 99.8 | 8.4 | 38.8 |
| C | 1 −20 | 1.1 | 5.0 | 11.8 | 13.9 | 68.2 |
| D | 1 −176 | | 0.8 | | 5.0 | 94.2 |

1 (−) indicates rising freeness.

It is thus seen that as the beating continues with changing freeness through the minimum value and into the increasing range that there is a marked shifting from the coarse, long fibers, such as are produced under the Hopkins et al. patent, to short, highly hydrated, gelatin-like fibers, from which is produced the paper of our invention.

With the conventional Fourdrinier type of paper-making machines, it is preferred to use a smooth metal belt to pick up the wet web from the forming wire and carry it to the drier. This arrangement gives a more effective pick-up wire.

Figure 2:
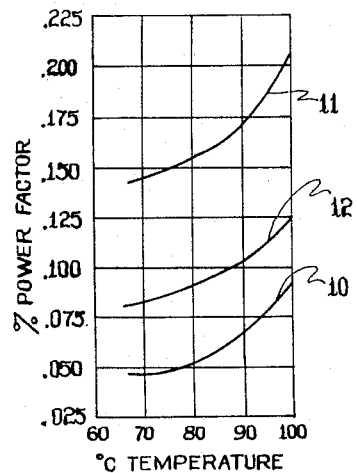
Fig. 2 is a graph illustrating the power factor improvements resulting from the present invention.

The power factor of the paper of the present invention at various operating temperatures is indicated by the curve 10 in Fig. 2, these measurements having been made at 60 cycles. Curve 11 represents the correspondingly measured power factor of the standard prior art condenser paper made of kraft fibers. Curve 12 represents the corresponding power factor of the paper described in the above Hopkins et al. patent, which paper is of a much lower density than that of the present invention. It will be noted that at temperatures of about 70° C. the power factor of the paper of the present invention is almost exactly half that of the best prior art paper, and fully one third of the ordinarily used paper. This general relationship is also maintained at higher temperatures up to and beyond about 100° C., which is in the upper range of usefulness of paper capacitors. In the past, capacitors with paper dielectrics have normally been limited to use at temperatures no higher than about 85° C., particularly where the capacitors are relatively large.

As indicated by the above curves, the paper dielectric of the present invention operates at appreciably higher efficiency than that obtainable from prior art techniques, and capacitors made with this dielectric can be built to operate at higher ambient temperatures and can have appreciably greater size.

Fig. 1 shows a typical capacitor according to the present invention. This capacitor is made by convolutely winding a pair of metal foils 23, 33 with sets of dielectric sheets 21, 22, 31, 32. Each set of dielectric sheets includes a pair of individual papers made as described above. This is in accordance with the well-known practice for guarding against the shorting out of the capacitor through imperfections normally found in the individual sheets. The likelihood of the alignment of the imperfections in the different sheets of one set is quite remote. The capacitor is provided with terminal connectors indicated as tabs 40, 41 which are connected to the separate foils as by being suitably fixed to them, or by being frictionally held between turns that are tightly wound. After the capacitor is completely wound, it may be impregnated in any suitable manner to increase its breakdown voltage and/or capacitance. This impregnation is well-known and described for example in the Robinson et al. Patent No. 2,526,688, granted October 24, 1950. Suitable housings or cases can be provided for the impregnated or unimpregnated capacitor as also described in this patent.

The form of capacitor in which the low power factor paper is used is not limited to those described above. Thus it can be used in the so-called ultraminiature type of capacitor in which a convolutely wound single dielectric ribbon carries on its surface a pair of intermeshing toothed conductive coatings positioned so that a tooth portion on one turn of the winding is in capacitive relationship with an oppositely polarized tooth portion on the adjacent turn of the winding, as described in Grouse Patent No. 2,637,766, granted May 5, 1953. The so-called inductive or non-inductive types of terminal connections may be used in any of the above constructions.

A mild alkali washing treatment can be used in preparation of the pulp without appreciably affecting the power factor of the resulting paper. It is desirable, moreover, to use such a washing step in order to increase the maximum voltage which the paper will withstand. This alkali treatment can be varied as by using sodium, potassium or other alkali metal hydroxide in concentrations varying from 0% to 10% for up to two hours, as well as by varying the temperature of the wash anywhere up to the boiling point of the wash solution. A 5% NaOH solution treatment at the boiling point for two hours is very effective. For neutralizing the wash alkali, any readily rinsed acid material such as dilute acetic or hydrochloric acid can be used.

A small amount of $TiO_2$, 0.1 to 0.5% of the washing liquor by weight, can be dissolved in the alkaline liquor if desired since this greatly reduces the amount of subsequent washing required to reduce the concentration of electrolytes to the desired low level.

The concentration of the pulp slurry, however pretreated, can be varied without appreciably changing the results obtained by the resulting beating. Concentrations as low as 1½% and as high as 2½% have proven highly effective with the Valley beater and concentrations of from 2% to 6% are suitable with a Bertram beater. The smoothly surfaced metal pick-up surface described above is conveniently made in the form of an endless band of thin stainless steel, copper-, nickel- or chromium-plated steel or copper, aluminum or nickel foil, suitably mounted on driving rollers in place of the conventional pick-up wire. However, the paper of the invention can also be formed on cylinder machines such as the standard tissue-making cylinders.

The paper of the present invention has remarkable utility in that it combines the porperties of low power factor and thinness with much higher densities than hitherto thought possible. It is further featured by tensile strengths believed out of reach with very thin capacitor papers. Capactitor manufacturers have been trying to reduce the thckness of paper dielectrics for many years by reason of the fact that even a small reduction in paper thickness effects a large decrease in overall condenser bulk inasmuch as the capacitance increases as the thickness decreases. The thinnest useful capacitor paper heretofore known was about 0.25 ml. thick, fully 100% thicker than the 0.12 ml. paper of the present invention. In spite of its thinness the paper of the present invention shows excellent formation and has a non-porous structure reflected by a high resistance to the passage of gases such as air under pressure. The available thinness appears to at least partially depend upon the high density and compact fiber arrangement of the paper, made possible by fiber size distribution within the pulp.

The power factor improvements shown above at 60 cycles per second are also shown at frequencies as high as 1000 cycles per second and higher.

Although the highly beaten pulp as described above is very effectively used by itself to make high density ultra thin papers having exceptional power factors, the pulp is desirably modified by the addition of about 3 to 10% of fibers having a length such that they do not pass through a 48 mesh screen. The addition can be made from fibers collected by a classifier in the range that pass through a 24 mesh screen and do not pass through a 48 mesh screen.

Alternatively there can be added to the highly beaten pulp a somewhat larger proportion of an unclassified pulp beaten so as to have an appreciable portion of such long fibers. By way of example about 7 to 23% of the pulp sample "A" of Table I can be used as modifying material. Such pulp, as shown in Table I, is beaten to a +60 ml. Schopper-Riegler freeness and almost half of the pulp is the desired fibers. In a similar way, an unclassified pulp beaten to a +50 ml. Schopper-Riegler freeness can be added in amounts of from about 7.5 to 25%.

The principal effect of the above addition is a sharp drop in white water losses during the sheet formation. Without the additions losses of over 10% occur, but the additions reduce these losses to 3% or less. The density, thickness and power factor of the final sheet is not perceptibly changed by the additions.

The pulp of the present invention is also benefitted by treatment with allyl chloride, allyl bromide or allylamine, preferably at temperatures of from about 70 to 120° C. for from 1 to 24 hours. The amount of allyl compound should be no more than stoichiometrically required to etherify 5 hydroxyl groups per glucose unit of the cellulose, and can be dissolved in a solvent such as aqueous alkali, water (in the case of allylamine) or benzene. A concentration of at least 20% allylating agent should be used. Excessive allylation should be avoided inasmuch as it renders the fibers unsuitable for sheet formation. Alkyl amines such as dimethylamine can also be so used.

The pulp of the present invention has a somewhat higher viscosity than a corresponding bleached pulp, being as high as 50 centipoises standard 1% TAPPI viscosity at 20° C. Some of the power factor improvement of the new pulp appears to be attributable to the higher viscosity. In general lower viscosities seem to consistently give poorer power factors. A viscosity range of from 25 to 50 centipoises at 20° C. under the standard 1% TAPPI condition is preferred.

Alternatively the pulp can be treated with a small amount of $N_2O_4$, 10% or less by weight for ½ to 2 hours at 20° C. and dissolved in carbon tetrachloride for example. Furthermore, it can have 1 to 10% cyanoethyl cellulose or sodium cellulose sulfate added without detracting from its sheet-forming ability and its electrical characteristics. If desired the pulps after beating or the final sheets, can be dehydrated by contacting with dimethyl sulfate or a silane such as vinyltrichlorosilane, that reacts with water present in the fibers. The silane treatment also waterproofs the paper but does not interfere with the impregnation of the final wound capacitor by mineral oils or the like.

This application is a continuation-in-part of the co-pending U.S. application, Serial No. 199,328 for Low Power Factor Capacitor, Dielectric, and Method of Making, filed December 5, 1950, now abandoned.

As many apparently widely different embodiments of this invention may be made without departing from the spirit and scope hereof, it is to be understood the invention is not limited to the specific embodiments hereof except as defined in the appended claims.

What is claimed is:
1. A capacitor having two spaced electrodes of opposite polarity, and between said electrodes, a dielectric paper, the fibers of which are essentially of unbleached coniferous sulfate pulp that has been beaten to the degree in which its Schopper-Riegler freeness is between about 75 and 175 ml. and is rising with continued beating said paper having a density greater than 1.0, and a power factor of less than about 0.100% at 100° C.

2. The capacitor of claim 1 in which the dielectric paper is less than 0.2 ml. thick.

References Cited in the file of this patent
UNITED STATES PATENTS

| | | |
|---|---|---|
| 1,998,758 | Holt | Apr. 23, 1935 |
| 2,505,545 | Hopkins | Apr. 25, 1950 |

OTHER REFERENCES

Harrison: Strength in Wood Pulp Papers (effect of beating), pages 458–461, Ind. & Eng. Chem., April 1934 92–Fr.

"Electrical Insulating Papers," by Race et al. in "The Paper Industry and Paper World." November 1940, pp. 792–796.

"A New Kraft Capacitor Paper," Miller, General Electric Review, December 1947, pp. 20–24.

UNITED STATES PATENT OFFICE
CERTIFICATE OF CORRECTION

Patent No. 2,934,686 April 26, 1960

Reavis C. Sproull et al.

It is hereby certified that error appears in the printed specification of the above numbered patent requiring correction and that the said Letters Patent should read as corrected below.

Column 4, lines 63 and 64, and column 6, lines 27 and 31, for "ml.", each occurrence, read -- mil --.

Signed and sealed this 11th day of October 1960.

(SEAL)
Attest:

KARL H. AXLINE
Attesting Officer

ROBERT C. WATSON
Commissioner of Patents